(12) United States Patent
Voelkel (10) Patent No.: US 7,959,135 B2
(45) Date of Patent: *Jun. 14, 2011

(54) SHOCK ABSORBER

(75) Inventor: Bret J. Voelkel, Jasper, IN (US)

(73) Assignee: Oric Holding, L.P., Jasper, IN (US)

( * ) Notice: Subject to any disclaimer, the term of this patent is extended or adjusted under 35 U.S.C. 154(b) by 1540 days.

This patent is subject to a terminal disclaimer.

(21) Appl. No.: 11/124,259

(22) Filed: May 9, 2005

(65) Prior Publication Data

US 2005/0200058 A1    Sep. 15, 2005

Related U.S. Application Data

(62) Division of application No. 09/562,817, filed on May 1, 2000.

(51) Int. Cl.
*F16F 9/04* (2006.01)

(52) U.S. Cl. .................................................. 267/64.21

(58) Field of Classification Search ............... 267/64.21, 267/64, 27, 64.28, 64.15, 64.24, 221, 256; 188/315, 322.16, 322.17

See application file for complete search history.

(56) References Cited

U.S. PATENT DOCUMENTS

| | | | |
|---|---|---|---|
| 2,056,106 A | | 9/1936 | Kuhn |
| 2,133,279 A | * | 10/1938 | Brown .......................... 267/256 |
| 2,536,626 A | * | 1/1951 | Coleman .................... 267/64.23 |
| 2,877,010 A | | 3/1959 | Gouirand |
| 2,973,954 A | | 3/1961 | Eater |
| 2,973,968 A | | 3/1961 | Behles |
| 2,979,350 A | * | 4/1961 | Lansky .......................... 277/552 |
| 3,042,392 A | | 7/1962 | Schmitz et al. |
| 3,060,963 A | | 10/1962 | Jackson |
| 3,063,732 A | | 11/1962 | Harbers et al. |
| 3,064,994 A | | 11/1962 | Limmer |
| 3,070,363 A | * | 12/1962 | Ellis, Jr. ......................... 267/126 |
| 3,281,138 A | | 10/1966 | Oster |
| 3,372,919 A | | 3/1968 | Jackson |
| 3,692,296 A | | 9/1972 | Higginbotham |

(Continued)

OTHER PUBLICATIONS

Photos of device reported to be a Maremont device allegedly available in the United States since the mid 1960's including a photograph of writing reported to be on a box in which the Maremont device was kept.

(Continued)

*Primary Examiner* — Christopher P Schwartz (74) *Attorney, Agent, or Firm* — Vedder Price P.C.; Ajay A. Jagtiani (57) ABSTRACT

The present invention provides a shock absorbing device comprising: a hollow spring including a chamber having a proximal end, a distal end, and a bellows comprised of a springy material connecting the proximal end to the distal end and enclosing the chamber; a shock absorber extending through the hollow spring, the shock absorber including a cylinder and a piston which slidably engages the cylinder, the cylinder extending through and being attached to the hollow spring proximal end, the piston extending through and slidably engaging the hollow spring distal and the piston including contacting device located distally of the hollow spring distal end for urging the hollow spring distal end proximally when the contacting device is forced against the hollow spring distal end and for urging the piston distally when the hollow spring distal end is forced against the contacting device. The present invention also provides mounts for a shock absorbing device and a shock absorbing system employing the shock absorbing device of the present invention.

14 Claims, 5 Drawing Sheets

U.S. PATENT DOCUMENTS

| | | | | |
|---|---|---|---|---|
| 3,734,483 | A * | 5/1973 | Adams | 267/64.11 |
| 3,744,123 | A | 7/1973 | Vers | |
| 3,776,536 | A * | 12/1973 | Henderson | 267/35 |
| 3,779,535 | A | 12/1973 | Strand | |
| 3,870,286 | A | 3/1975 | Willich | |
| 4,200,270 | A | 4/1980 | Merkle | |
| 4,206,907 | A | 6/1980 | Harrod | |
| 4,325,541 | A * | 4/1982 | Korosladanyi et al. | 267/220 |
| 4,434,977 | A | 3/1984 | Chiba et al. | |
| 4,445,673 | A | 5/1984 | Clark | |
| 4,502,673 | A * | 3/1985 | Clark | 267/64.24 |
| 4,534,580 | A | 8/1985 | Kobayashi et al. | |
| 4,555,096 | A | 11/1985 | Pryor | |
| 4,575,115 | A | 3/1986 | Tatemoto et al. | |
| 4,588,171 | A | 5/1986 | Stephens | |
| 4,598,929 | A | 7/1986 | Kumagai et al. | |
| 4,613,116 | A * | 9/1986 | Buma | 267/64.25 |
| 4,616,811 | A | 10/1986 | Buma | |
| 4,629,170 | A | 12/1986 | Warmuth, II | |
| 4,635,745 | A | 1/1987 | Myers et al. | |
| 4,635,909 | A | 1/1987 | Gold | |
| 4,648,623 | A | 3/1987 | Cameron | |
| 4,655,438 | A | 4/1987 | Cameron | |
| 4,659,070 | A | 4/1987 | Buma | |
| 4,660,810 | A | 4/1987 | Buma | |
| 4,666,135 | A | 5/1987 | Buma et al. | |
| 4,673,171 | A | 6/1987 | Buma | |
| 4,683,993 | A | 8/1987 | Tanabe et al. | |
| 4,688,774 | A | 8/1987 | Warmuth, II | |
| 4,690,430 | A | 9/1987 | Buma | |
| 4,697,796 | A | 10/1987 | Kitamure et al. | |
| 4,712,776 | A | 12/1987 | Geno et al. | |
| 4,768,758 | A | 9/1988 | Buma | |
| 4,771,994 | A | 9/1988 | Makita | |
| 4,796,870 | A | 1/1989 | Hoffman et al. | |
| 4,802,657 | A | 2/1989 | Wijnhoven et al. | |
| 4,805,882 | A | 2/1989 | Veaux et al. | |
| 4,817,928 | A | 4/1989 | Paton | |
| 4,841,874 | A | 6/1989 | Weigel | |
| 4,844,428 | A | 7/1989 | Margolis et al. | |
| 4,883,288 | A | 11/1989 | Finn et al. | |
| 4,896,752 | A | 1/1990 | Shtarkman | |
| 4,911,416 | A | 3/1990 | Warmuth, II | |
| 4,921,226 | A | 5/1990 | Pees | |
| 4,934,667 | A | 6/1990 | Pees et al. | |
| 4,961,594 | A | 10/1990 | Pees | |
| 4,988,082 | A | 1/1991 | Pees | |
| 4,989,844 | A | 2/1991 | Wijnhoven et al. | |
| 4,993,694 | A | 2/1991 | Gandiglio et al. | |
| 5,009,401 | A | 4/1991 | Weitzenhof | |
| 5,039,072 | A | 8/1991 | Bartholomew | |
| 5,044,614 | A * | 9/1991 | Rau | 267/221 |
| 5,058,868 | A * | 10/1991 | Sirven | 267/259 |
| 5,060,959 | A | 10/1991 | Davis et al. | |
| 5,098,071 | A * | 3/1992 | Umetsu | 267/64.27 |
| 5,107,970 | A * | 4/1992 | Driessen et al. | 188/322.16 |
| 5,129,634 | A | 7/1992 | Harris | |
| 5,135,203 | A * | 8/1992 | Wijnhoven et al. | 267/64.21 |
| 5,180,144 | A | 1/1993 | Hellyer et al. | |
| 5,199,690 | A | 4/1993 | Marshall | |
| 5,255,935 | A | 10/1993 | Imani | |
| 5,314,045 | A | 5/1994 | Fenn et al. | |
| 5,342,029 | A | 8/1994 | Carter | |
| 5,346,246 | A | 9/1994 | Lander et al. | |
| 5,366,048 | A | 11/1994 | Watanabe et al. | |
| 5,417,042 | A | 5/1995 | Walch et al. | |
| 5,449,150 | A | 9/1995 | Watanabe et al. | |
| 5,477,948 | A * | 12/1995 | Stevens | 267/221 |
| 5,480,129 | A | 1/1996 | Gilsdorf et al. | |
| 5,487,535 | A | 1/1996 | Carter et al. | |
| 5,518,225 | A * | 5/1996 | Gubitz | 267/64.24 |
| 5,575,360 | A | 11/1996 | Gubitz et al. | |
| 5,584,497 | A | 12/1996 | Lander et al. | |
| 5,636,831 | A | 6/1997 | Gubitz | |
| 5,649,691 | A | 7/1997 | Handke et al. | |
| 5,649,692 | A * | 7/1997 | Gilsdorf et al. | 267/64.21 |
| 5,667,203 | A | 9/1997 | Romer | |
| 5,669,597 | A | 9/1997 | Rittstieg et al. | |
| 5,678,810 | A | 10/1997 | Summers, III et al. | |
| 5,682,966 | A | 11/1997 | Cabrerizo-Pariente | |
| 5,752,692 | A | 5/1998 | Crabtree et al. | |
| 5,797,595 | A | 8/1998 | Buma et al. | |
| 5,918,863 | A | 7/1999 | Crabtree et al. | |
| 5,957,252 | A | 9/1999 | Berthold | |
| 5,996,978 | A | 12/1999 | Asanuma et al. | |
| 5,996,980 | A | 12/1999 | Frey et al. | |
| 6,042,092 | A | 3/2000 | Shibata | |
| 6,076,814 | A | 6/2000 | Grundei | |
| 6,079,725 | A * | 6/2000 | Lazaros | 280/250.1 |
| 6,086,060 | A | 7/2000 | Berthold | |
| 6,158,559 | A | 12/2000 | Asa et al. | |
| 6,237,902 | B1 | 5/2001 | Lindstrom | |
| 6,270,064 | B1 | 8/2001 | Tachikawa | |
| 6,286,820 | B1 * | 9/2001 | Raulf et al. | 267/64.21 |
| 6,322,058 | B1 * | 11/2001 | Tanigawa et al. | 267/64.15 |
| 8,374,966 | | 4/2002 | Lillbacka | |
| 6,398,198 | B1 | 6/2002 | Okamoto | |
| 6,581,918 | B2 * | 6/2003 | Voelkel | 267/64.27 |

OTHER PUBLICATIONS

Photos of device reported to be a Monroe Max Aire device privately branded by Chassis Tech as "Hot Aire" and allegedly available in the United States since the early 1970's.

Photos of device reported to be a FUNCO Motorsports device allegedly on sale since 1982.

Photos of device reported to be Sachs device taken from a 1997 BMW 523.

Photos of device reported to be a Hot Aire device manufactured by American Innovative Manufacturing (AIM Industries) and allegedly publicly displayed by AIM at the Specialty Equipment Market Association (SEMA) tradeshow in Nov. 1998 and offered for sale in AIM's product catalog of Apr. 1999.

Photograph of HotAire shock absorber digitally dated Jan. 11, 1999 and schematic of same, dated Jan. 22, 1999.

Truckin' Magazine, p. 28, (Apr. 1999).

Photographs of device reported to be Bag-Over shock manufactured by Empire Motor Sports that is referenced in the Apr. 1999 Truckin' Magazine at p. 28 and for which a prototype is reported to have been displayed at tradeshows beginning in 1998 and for which sporadic sales are reported to have been made starting in middle to late 1998.

Photos of device reported to be a Delco Pleasure Lift device (Date Unknown.).

* cited by examiner

SHOCK ABSORBER

CROSS-REFERENCE TO RELATED APPLICATIONS

This application is a divisional of U.S. application Ser. No. 09/562,817 filed May 1, 2000, the entire disclosure and contents of which is hereby incorporated by reference.

BACKGROUND OF THE INVENTION

1. Field of the Invention

The present invention relates to shock absorbers.

2. Description of the Prior Art

Although many individuals who drive "hot rod" or "street rod" cars prefer suspension systems that provide an "old time hot rod ride", allowing the driver to feel every bump, dip and pothole in the road, there are many drivers who prefer having a higher "ride quality," i.e., a more cushioned ride. However, in order to provide a higher ride quality on such a car, it has been necessary to use fairly complex suspension systems, often from non-standard automobile parts. For example, suspensions for hot rods using typical air ride systems may require hours to fabricate and install. Also, such suspension systems typically require a shock absorber to be mounted outboard, thereby sacrificing tire clearance for ride comfort.

SUMMARY OF THE INVENTION

It is therefore an object of the present invention to provide a shock absorbing device that may be easily used in existing vehicle systems.

It is a further object of the present invention to provide a shock absorbing device that is easy to manufacture.

It is yet another object of the present invention to provide a shock absorbing device that allows for the easy adjustment of ride height of the vehicle on which the shock absorbing device is mounted.

It is yet another object of the present invention to provide a shock absorbing device that allows for the easy adjustment of the springiness of the ride of the vehicle on which the shock absorbing device is mounted.

It is yet another object of the present invention to provide shock absorbing device having a dual resistance motion dampening action.

It is yet another object of the present invention to provide a dual resistance motion dampening action that is axially aligned.

According to a first broad aspect, the present invention provides a shock absorbing device comprising: a hollow spring including a chamber having a proximal end, a distal end, and a bellows comprised of a springy material connecting the proximal end to the distal end and enclosing the chamber; a shock absorber extending through the hollow spring, the shock absorber including a cylinder and a piston which slidably engages the cylinder, the cylinder extending through and being attached to the hollow spring proximal end, the piston extending through and slidably engaging the hollow spring distal and the piston including contacting means located distally of the hollow spring distal end for urging the hollow spring distal end proximally when the contacting means is forced against the hollow spring distal end and for urging the piston distally when the hollow spring distal end is forced against the contacting means.

According to a second broad aspect, the present invention provides a mounting device comprising: a first mount for mounting on and for sealing a first end of a hollow spring and for circumferentially and fixedly engaging a cylinder of a shock absorber.

According to a third broad aspect, the present invention provides a mounting device comprising a mount for mounting on and for sealing an end of a hollow spring and for circumferentially and slidably engaging a piston of an elongated shock absorber.

According to a fourth broad aspect, the present invention provides shock absorber/spring system comprising: at least one shock absorbing device, the shock absorbing device comprising; a hollow spring including a chamber having a proximal end, a distal end, and at least one wall comprised of a springy material connecting the proximal end to the distal end and enclosing the chamber; and a shock absorber extending through the hollow spring, the shock absorber including a cylinder and a piston which slidably engages the cylinder, the cylinder extending through and being attached to the hollow spring proximal end, the piston extending through and slidably engaging the hollow spring distal and the piston including contacting means located distally of the hollow spring distal end for urging the hollow spring distal end proximally when the contacting means is forced against the hollow spring distal end and for urging the piston distally when the hollow spring distal end is forced against the contacting means; and means for filling the hollow spring with a spring filling fluid.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "proximal" refers to the direction towards the cylinder of the shock absorber of the present invention.

For the purposes of the present invention, the term "distal" refers to the direction away from the cylinder of a shock absorber of the present invention.

For the purposes of the present invention, the term "filled" refers to a spring, chamber, etc. being either totally or partially filled with a fluid or gaseous media, such as air or water, unless specified otherwise.

For the purpose of the present invention, the term "shock absorber" refers to any shock absorber having a piston that slides within a cylinder, such as the conventional type of shock absorbers used in 7 car or other vehicle suspension systems.

For the purpose of the present invention, the term "bellows" refers to one or more walls of a spring material such as rubber, plastic or other malleable material. A bellows used in the present invention may form one continuous wall, such as the wall of a two-compartment bellows or cylindrical bellows of the embodiments of the invention described below and shown in the drawings. However, a bellows of the present invention may have various shapes and include more than one wall. For example a bellows of the present invention having a hexagonal cross section may have six walls.

For the purpose of the present invention, the term "hollow spring" refers to a substantially sealed bellows that may be totally or partially filled with a spring filling fluid such as a gas or liquid. An example of a hollow spring of the present invention is a modified conventional two compartment air spring, having a mount attached to each of the air spring's open ends to seal off each of the open ends. Suitable air springs that may be so modified with two mating rings and two mounts to form a hollow spring of the present invention include the conventional truck air springs manufactured by Firestone®. Another example of an air spring that may be modified for use with the present invention is shown in U.S. Pat. No. 5,346,246, the entire disclosure and contents of which is hereby incorporated by reference. Although a few types of hollow springs are described below and shown in the drawings, the hollow spring of the present invention may have various shapes.

For the purposes of the present invention, the term "springy material" refers to a springy substance such as rubber or plastic that resists compression and springs back to substantially its original shape when a compressive force is no longer exerted on the substance. Examples of springy materials include the types of rubbers and/or plastics used to form the walls of conventional bellows for air springs of the type used on trucks and other vehicles.

For the purposes of the present invention, the term "spring filling fluid" refers to a fluid such as a liquid or gas, such as air, that may be used to fill the hollow spring of the present invention to provide pressure within the hollow spring to resist compression. One example of such a resistance material is air, but other types of gases or fluids may also be used as a spring filling fluid for the present invention.

For the purposes of the present invention, the term "cylinder resistance material" refers to a gas or fluid, such as oil, used as a resistance material in the cylinder of a shock absorber.

For the purposes of the present invention, the term "circumferentially engages" refers to a mount or other object circumferentially contacting a cylinder or piston of a shock absorber of the present invention. In the case a cylinder of the present of the present invention, a circumferential engagement may be used to fix the cylinder in place with respect to the hollow spring mount that engages the cylinder. In the case of a piston of the present invention, a circumferential engagement may be used to guide the sliding of the piston with respect to the hollow spring mount that engages the piston.

Description

Figure 1A:
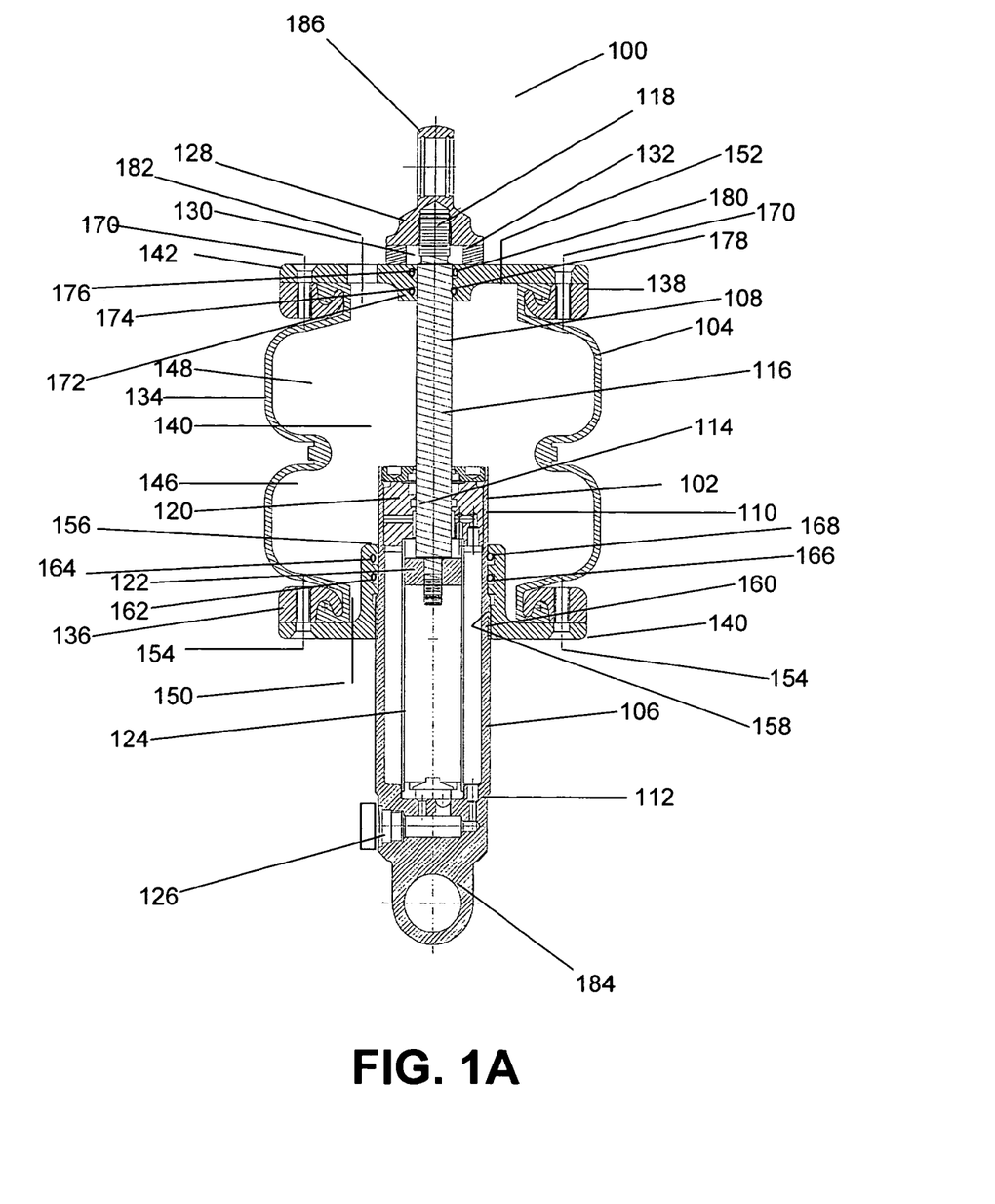
FIG. 1A illustrates an extended configuration of a shock absorbing device of the present invention having a two-chambered hollow spring.
Figure 1B:
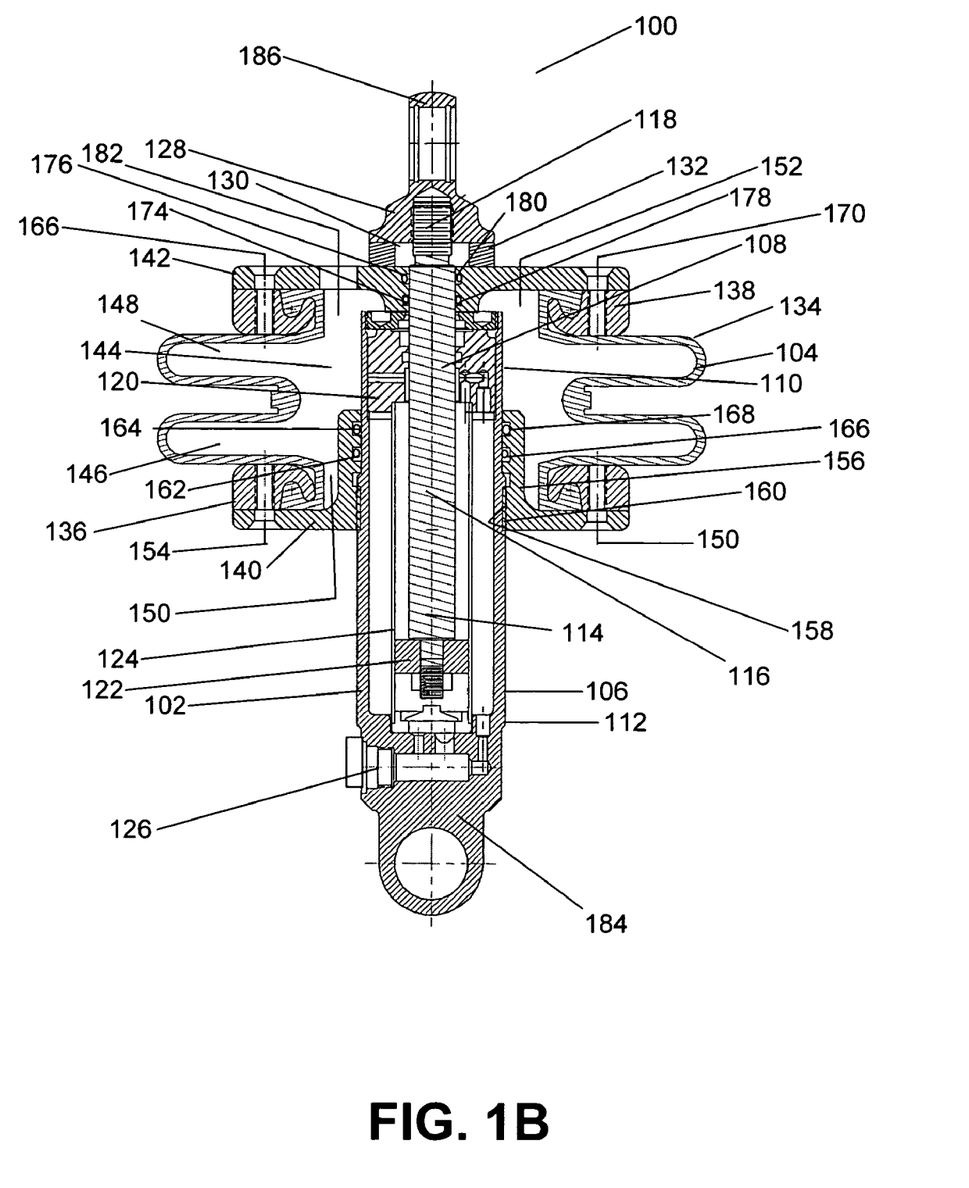
FIG. 1B illustrates a compressed configuration of the shock absorbing device of FIG. 1A.

FIGS. 1A and 1B illustrate a shock absorbing device 100 of a preferred embodiment of the present invention. Shock absorbing device 100 is comprised of a conventional shock absorber 102 and a hollow spring 104.

Shock absorber 102 includes a cylinder 106 and piston 108. Cylinder 106 includes a cylinder distal end 110 that extends into hollow spring 104 and a cylinder proximal end 112 that extends out of hollow spring 104. Piston 108 includes a piston proximal end 114 that slides into and out of cylinder 106; a piston middle portion 116 that slides into and out of hollow spring 104; and a piston distal end 118 that extends from hollow spring 104. Cylinder 106 includes a bushing 120 that slidably engages piston proximal end 114 to allow piston proximal end 114 to slide into and out of cylinder 106. Piston 108 includes a proximal end ring 122 that slidably engages a cylinder chamber 124 of cylinder 106 and prevents piston proximal end 114 from completely sliding through bushing 120 and out of cylinder 106. A cylinder resistance material (not shown) such as oil, present in cylinder chamber 124, provides resistance against the movement of proximal end ring 122 and piston proximal end 114, both into and out of cylinder 106. Cylinder 106 includes a conventional resistance adjusting device 126 that may be used to adjust the pressure of cylinder resistance material (not shown) in cylinder chamber 124, and thereby adjust the resistance piston 108 experiences as piston 108 moves into and out of cylinder 106.

Mounted on piston distal end 118 is a piston head 128. Directly below piston head 128 is a guide nut 130 screwed onto piston distal end 118. Circumferentially surrounding guide nut 130 is a spacer 132, preferably made from a hard material such as metal, or a plastic such as Delrin®. As piston 108 moves into and out of hollow spring 104, spacer 132 slides along piston 108.

Hollow spring 104, which is filled with a gas or fluid (not shown) includes a conventional bellows 134, a proximal mating ring 136, a distal mating ring 138, a proximal mount 140, a distal mount 142, and an interior chamber 144. Bellows 134 includes: a proximal compartment 146; a distal compartment 148; a proximal open end 150; and a distal open end 152. Proximal mating ring 136 is mounted on proximal open end 150 and distal mating ring 138 is mounted on distal open end 152. Proximal open end 150 is closed by proximal mount 140 which is mounted on proximal mating ring 136 by six screws 154 (only two of which are visible in FIGS. 1A and 1B). Preferably, proximal mount 140 is made from a strong and durable material such as plastic or metal, such as aluminum. It should be appreciated that any number of screws or other attaching means may be used and still be within the scope of the present invention. Proximal mount 140 includes a threaded neck 156 that extends into bellows 134. Threaded neck 156 has neck threads 158 that engage corresponding cylinder threads 160 on cylinder 106 to allow cylinder 106 to be locked into place with respect to proximal mount 140. Threaded neck 156 also includes two rubber O-rings 162 and 164 that are mounted in circular grooves 166 and 168, respectively. O-rings 162 and 164 assist in providing a tight seal between cylinder 106 and proximal mount 140. Distal open end 152 is closed by a distal mount 142 of hollow spring that is mounted on distal mating ring 138 by six screws 170 (only two of which are visible in FIGS. 1A and 1B). Preferably, distal mount 142 is made from a strong and durable material such as plastic or metal, such as aluminum. Distal mount 142 includes a distal mount neck 172 that extends into bellows 134. Distal mount neck 172 includes two rubber O-rings 174 and 176 that are mounted in two respective circular grooves 178 and 180. O-rings 174 and 176 slidably engage piston 108 as piston 108 slides into and out of hollow spring 104. Distal mount 142 includes a distal mount opening 182 that allows gas or fluid to be pumped into hollow spring 104 or to let a gas or fluid out of hollow spring 104 using a conventional pumping mechanism, such as an air pump (not shown) having a hose (not shown) that is attached to distal mount opening 182. Once the gas or fluid hollow spring 104 is determined to be at a desired pressure, a conventional plug (not shown) may be inserted into distal mount opening 182 to close distal mount opening 182. Alternatively, a pressure monitoring and a gas or fluid supply system (not shown) may be continuously attached to hollow spring 104 at distal mount opening 182 to maintain and/or adjust the air pressure in hollow spring 104.

Shock absorbing device 100 may be mounted similarly to a conventional shock absorber using cylinder end mounting 184 and piston end mounting 186. Although cylinder end mounting 184 and piston end mounting 186 are shown as being orthogonally oriented with respect to each other in the FIGS. 1A and 1B, because piston 108 is free to rotate with respect to cylinder 106, cylinder end mounting 184 and piston end mounting 186 may be arranged at any rotational angle to allow shock absorbing device 100 to be mounted on a car or other vehicle.

FIG. 1A shows shock absorbing device 100 in an extended configuration. In FIG. 1A hollow spring 104 is filled with a spring filling fluid, such as air, so that distal mount 142 contacts guide nut 130 and spacer 132 to urge guide nut 130 and spacer 132 distally from cylinder 106, thereby urging piston head 128 distally from cylinder 106. In the extended configuration shown in FIG. 1A, shock absorbing device 100 functions like a conventional mechanical or spring or air spring to support a vehicle (not shown) on which shock absorbing device 100 is mounted. Guide nut 130, which may be any convenient shape such as hexagonal, octagonal, etc., aligns spacer 132, to insure full contact between spacer 132 and piston head 128 and between spacer 132 and distal mount 142.

FIG. 1B shows shock absorbing device 100 in a compressed configuration. In FIG. 1B, shock absorbing device 100 is compressed due to an outside force, such as is caused by a vehicle (not shown) on which shock absorbing device 100 is mounted driving over a bumpy road. In FIG. 1B, a compressive force has caused piston head 128 to move proximally to urge spacer 132 against hollow spring 104 thereby urging distal mount 142 proximally toward cylinder 106 to compress hollow spring 104. As piston head 128 moves proximally, guide nut 130 also moves proximally and urges distal mount 142 proximal to compress hollow spring 104. As shock absorbing device 100 is compressed and piston head 128 is forced proximally, the cylinder resistance material (not shown) present in cylinder chamber 124, resists the motion of piston 108 into cylinder 106 thereby dampening the motion of piston head 128, just as in a conventional shock absorber. Also resisting the compression of shock absorbing device 100 is the spring filling fluid (not shown) filling hollow spring 104. Guide nut 130, which may be any convenient shape such as hexagon, octagonal, etc., aligns spacer 132, to insure full contact between spacer 132 and piston head 128 and between spacer 132 and distal mount 142. In use on a car or other vehicle, the shock absorbing device of the present invention provides a dual resistance motion dampening action because of the interactions of the shock absorber and the hollow spring of the present invention. The shock absorbing device of the present invention also provides an axially aligned dual resistance motion dampening action, because the shock absorber and the hollow spring share the same axis and, therefore, the principal compression and expansion motions of the shock absorber and hollow spring are axially aligned.

By adjusting the amount/pressure of the spring filling fluid in the hollow spring of the present invention, configurations intermediate between the configurations shown in FIGS. 1A and 1B may be obtained. For example, more or less air may be pumped into the hollow spring to adjust the ride height of the vehicle relative to the wheel on which the shock absorbing spring of the present invention is mounted. The amount of spring filling fluid and the type of spring filling fluid filling the hollow spring will also affect the springiness of the shock absorbing device of the present invention, and hence, the springiness of the ride of the vehicle on which the shock absorbing device is mounted.

The hollow spring shown in FIGS. 1A and 1B is a bellows that is used as a component of an off the shelf air spring from Firestone®. The proximal and distal mating rings, are crimped on to this bellows to allow the proximal and distal mounts, respectively, to be mounted on the bellows.

Figure 2A:
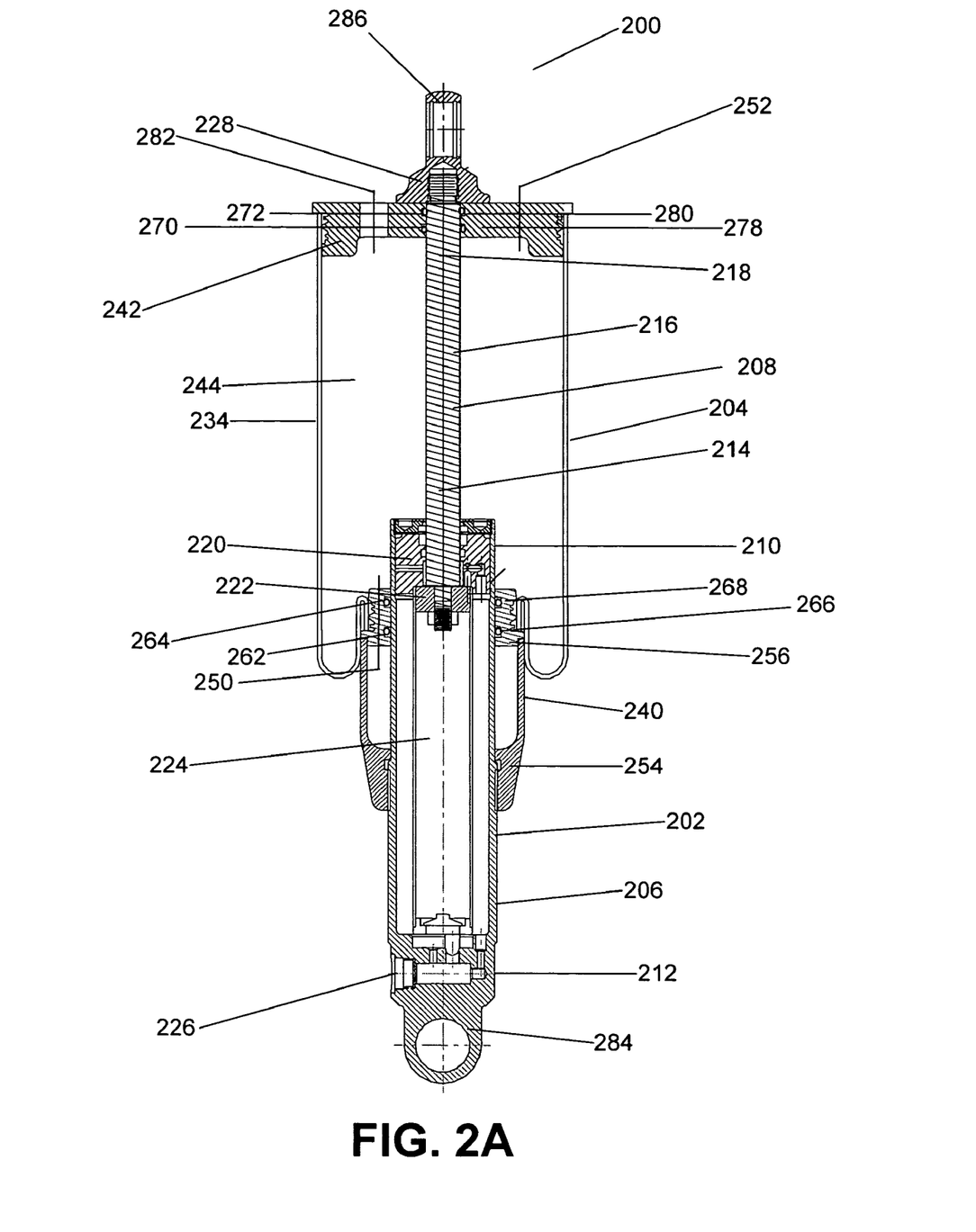
FIG. 2A illustrates an extended configuration of a shock absorbing device of the present invention having a tapered cylinder hollow spring.
Figure 2B:
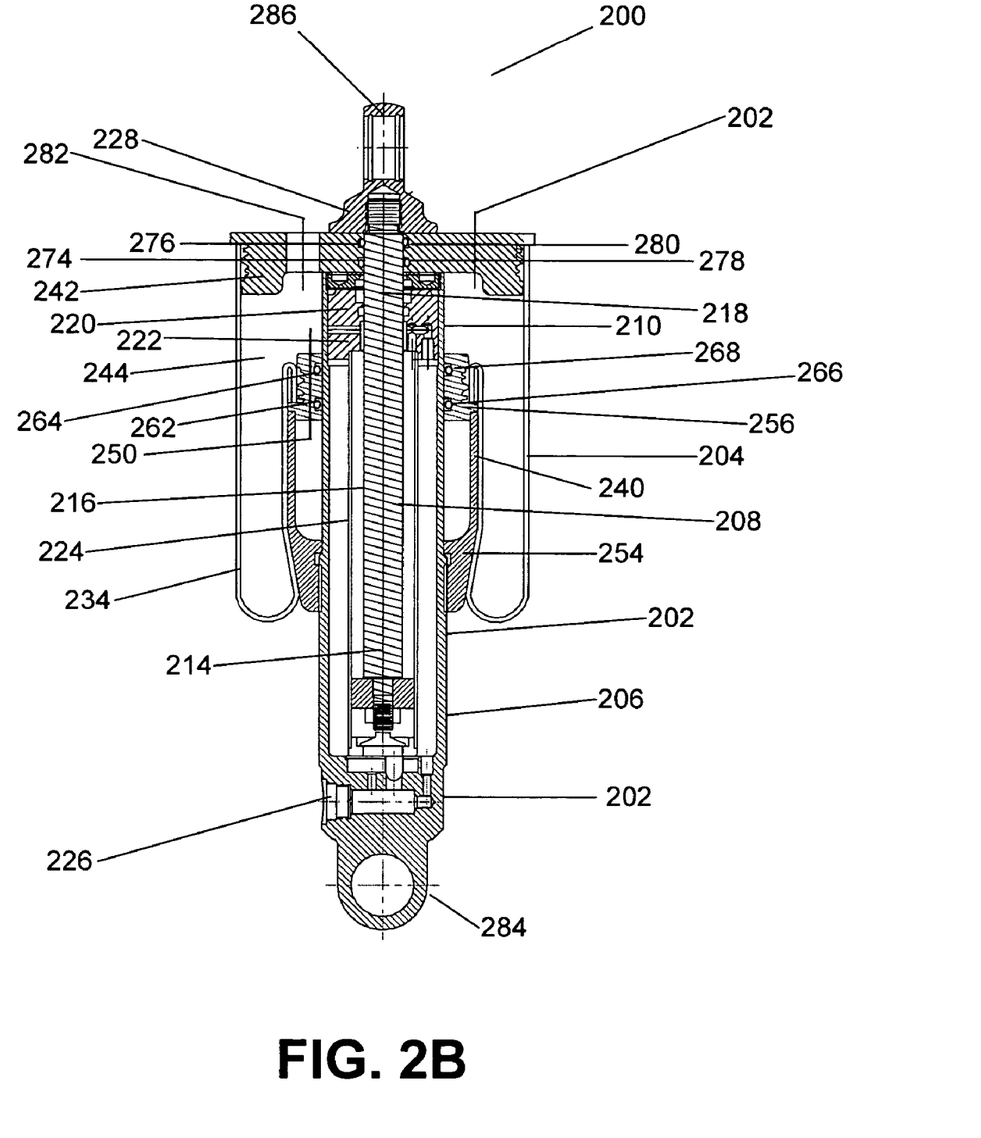
FIG. 2B illustrates a compressed configuration of the shock absorbing device of FIG. 2A.

FIGS. 2A and 2B illustrate a shock absorbing device 200 of a preferred embodiment of the present invention. Shock absorbing device 200 is comprised of a conventional shock absorber 202 and a hollow spring 204.

Shock absorber 202 includes a cylinder 206 and piston 208. Cylinder 206 includes a cylinder distal end 110 that extends into hollow spring 204 and a cylinder proximal end 202 that extends out of hollow spring 204. Piston 208 includes a piston proximal end 214 that slides into and out of cylinder 206; a piston middle portion 216 that slides into and out of hollow spring 204; and a piston distal end 218 that extends from hollow spring 204. Cylinder 206 includes a bushing 220 that slidably engages piston proximal end 214 to allow piston proximal end 214 to slide into and out of cylinder 206. Piston 208 includes a proximal end ring 222 that slidably engages a cylinder chamber 224 of cylinder 206 and prevents piston proximal end 214 from completely sliding through bushing 220 and out of cylinder 206. A cylinder resistance material (not shown) such as oil, present in cylinder chamber 224, provides resistance against the movement of proximal end ring 222 and piston proximal end 214, both into and out of cylinder 206. Cylinder 206 includes a conventional resistance adjusting device 226 that may be used to adjust the pressure of cylinder resistance material (not shown) in cylinder chamber 224, and thereby adjust the resistance piston 208 experiences as piston 208 moves into and out of cylinder 206. Mounted on piston distal end 218 is a piston head 228.

Hollow spring 204, which is filled with a gas or fluid (not shown) includes a bellows 234, a two-part proximal mount 240, a distal mount 242, and an interior chamber 244. Bellows 234 includes a proximal open end 250; and a distal open end 252. Two-part proximal mount 240 includes a proximal adapter 254 and a distal adapter 256, which may both be made from a hard substance such as plastic or metal. Preferably, proximal adapter 254 and distal adapter 256 are made from aluminum. A distal adapter 256 of two-part proximal mount 240 is mounted on proximal open end 250 to close proximal open end 250. Proximal adapter 254 is mounted on cylinder 206 and abuts distal adapter 256. Depending on the particular application, proximal adapter 254 may or may not be fixed to distal adapter 256 by conventional means. If proximal adapter 254 merely abuts, and is not fixed to distal adapter 256, distal adapter 256 may be moved distally by a user of shock absorbing device 200 to allow for the servicing of shock absorber 102. However, distal adapter 256 is prevented from moving proximally beyond where distal adapter 256 abuts proximal adapter 254 as shown in FIGS. 2A and 2B. Distal adapter 256 is mounted on distal open end 252 by conventional means such as forcing fitting or screw fitting to close open end 252.

Proximal adapter 254 may be fixed to cylinder 206 by conventional means such a screw fitting or welding. Distal adapter 256 includes two rubber O-rings 262 and 264 that are mounted in circular grooves 266 and 268, respectively. O-rings 262 and 264 assist in providing a tight seal between cylinder 206 and distal adapter. Distal open end 252 is closed by a distal mount 242. Distal mount 242 replaces the conventional proximal end piece (not shown) for bellows 234 and is mounted on bellows 234 by conventional means such as forcing fitting or screw fitting. Preferably, distal mount 242 is made from a strong and durable material such as plastic or metal, such as aluminum. Distal mount 242 includes two rubber O-rings 274 and 276 that are mounted in two respective circular grooves 278 and 280. O-rings 274 and 276 slidably engage piston 208 as piston 208 slides into and out of hollow spring 204. Distal mount 242 includes a distal mount opening 282 that allows gas or fluid to be pumped into hollow spring 204 or to let a gas or fluid out of hollow spring 204 using a conventional pumping mechanism, such as an air pump (not shown) having a hose (not shown) that is attached to distal mount opening 282. Once the gas or fluid hollow spring 204 is determined to be at a desired pressure, a conventional plug (not shown) may be inserted into distal mount opening 282 to close distal mount opening 282. Alternatively, a pressure monitoring and a gas or fluid supply system (not shown) may be continuously attached to hollow spring 204 at distal mount opening 282 to maintain and/or adjust the air pressure in hollow spring 204.

Shock absorbing device 200 may be mounted similarly to a conventional shock absorber using cylinder end mounting 284 and piston end mounting 286. Although cylinder end mounting 284 and piston end mounting 286 are shown as being orthogonally oriented with respect to each other in the FIGS. 2A and 2B, because piston 208 is free to rotate with respect to cylinder 206, cylinder end mounting 284 and piston end mounting 286 may be arranged at any rotational angle to allow shock absorbing device 200 to be mounted on a car or other vehicle.

FIG. 2A shows shock absorbing device 200 in an extended configuration. In FIG. 2A, hollow spring 204 is filled with a spring filling fluid, such as air, so that distal mount 242 contacts piston head 228 and urges piston head 228 distally from cylinder 206. In the extended configuration shown in FIG. 2A, shock absorbing device 200 functions like a conventional mechanical or spring or air spring to support a vehicle (not shown) on which shock absorbing device 200 is mounted.

FIG. 2B shows shock absorbing device 200 in a compressed configuration. In FIG. 2B, shock absorbing device 200 is compressed due to an outside force, such as is caused by a vehicle (not shown) on which shock absorbing device 200 is mounted driving over a bumpy road. In FIG. 2B, a compressive force has caused piston head 228 to move proximally, to contact distal mount 242, and to urge distal mount 242 proximally toward cylinder 206 to compress hollow spring 204. As shock absorbing device 200 is compressed and piston head 228 is forced proximally, the cylinder resistance material (not shown) present in cylinder chamber 224, resists the motion of piston 208 into cylinder 206 thereby dampening the motion of piston head 228, just as in a conventional shock absorber. Also resisting the compression of shock absorbing device 200 is the spring filling fluid (not shown) filling hollow spring 204. In use on a car or other vehicle, the shock absorbing device of the present invention provides a dual resistance motion dampening action because of the interactions of the shock absorber and the hollow spring of the present invention.

The shock absorbing device of the present invention also provides an axially aligned dual resistance motion dampening action, because the shock absorber and the hollow spring share the same axis and, therefore, the principal compression and expansion motions of the shock absorber and hollow spring are axially aligned.

By adjusting the amount/pressure of the spring filling fluid in the hollow spring of the present invention, configurations intermediate between the configurations shown in FIGS. 2A and 2B may be obtained. For example, more or less air may be pumped into the hollow spring to adjust the ride height of the vehicle relative to the wheel on which the shock absorbing spring of the present invention is mounted. The amount of spring filling fluid and the type of spring filling fluid filling the hollow spring will also affect the springiness of the shock absorbing device of the present invention, and hence, the springiness of the ride of the vehicle on which the shock absorbing device is mounted.

Because the piston and cylinder end mountings of the shock absorbing device of the present invention may be the piston and cylinder end mountings of a conventional shock absorber, the shock absorbing device of the present invention may be easily used as a replacement for conventional shock absorbers.

Although conventionally dimensioned air spring bellows are used to form the hollow spring of the present invention in the above-described embodiments, the shape of the bellows may be altered to allow the shock absorbing device to be more easily mounted in particular vehicle suspension systems or may be altered if a spring filling fluid other than air is used.

A preferred shock absorber for use with the present invention is a HAL shock absorber made by QA1. However, various kinds of conventional shock absorbers may be used in the shock absorbing device of the present invention and the present invention contemplates using other kinds of shock absorbers in addition to the particular shock absorber described above.

The hollow spring of the present invention may be manufactured by modifying a conventional air spring, as described above, or may be made as a custom unit for use with the shock absorbing device of the present invention. One suitable air spring having two chambers that may be modified for use with the shock absorbing device of the present invention are manufactured by Firestone® for use as air springs for trucks. Although two hollow springs having two different shapes are described above and shown in the drawings, the hollow spring of the present invention may also have other shapes such as a rectangular box, a square box, a triangular box, etc.

Although the shock absorbing device of the present invention has been described for use with a vehicle suspension system, the present invention may also be useful in other force dampening applications such as: vehicle engine mounts, aircraft landing gear, vehicle crash resistance, motion dampening of building structures, etc.

Figure 3:
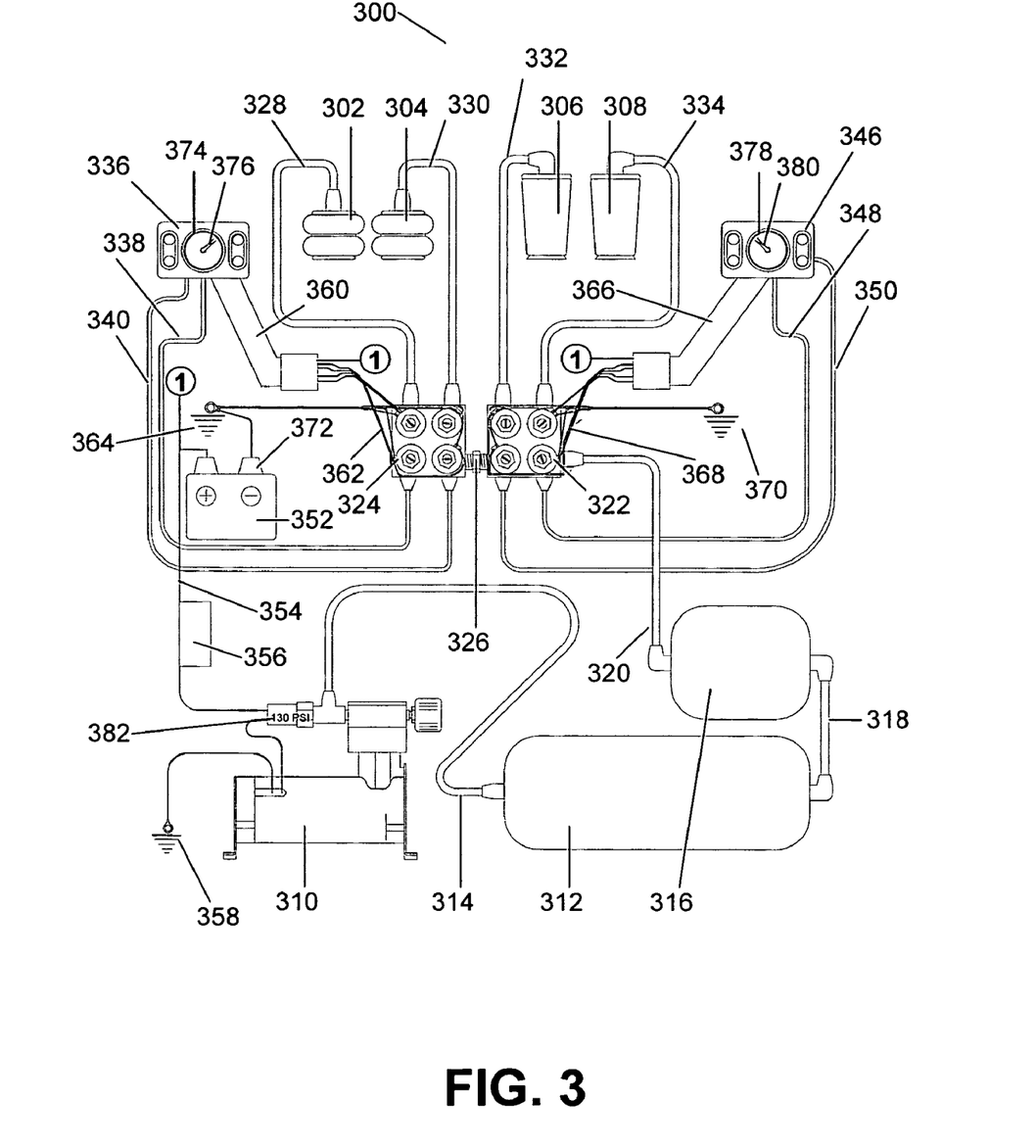
FIG. 3 illustrates in schematic form a shock absorber/spring system of the present invention.

FIG. 3 illustrates a shock absorber/spring system 300 of the present invention in schematic form with details of various components of system 300 left out for simplicity in explaining the functioning of system 300. System 300 includes two front air springs 302 and 304 of two respective front shock absorbing devices (not shown) of the present invention, and two rear air springs 306 and 308 of two respective rear shock absorbing devices (not shown) of the present invention.

A compressor 310 is connected to a supplemental reservoir tank 312 by a hose 314. Supplemental reservoir tank 312 is connected to a main reservoir tank 316 by a connecting hose 318. Compressor 310 generates compressed air to fill main reservoir tank 316 and a supplemental reservoir tank 312.

Main reservoir tank 316 is connected by a supply hose 320 to supply a rear junction box 322. Rear junction box 322 is connected to a front junction box 324 by a connection 326 so that front junction box 324 may be supplied with air from main reservoir tank 316. Front air springs 302 and 304 are supplied with air from front junction box 324 by front delivery hoses 328 and 330, respectively. Rear air springs 306 and 308 are supplied with air from rear junction box 322 by rear delivery hoses 332 and 334. A front control panel 336 is pneumatically connected to delivery hoses 328 and 330 by front junction box 324 and front gauge hoses 338 and 340, respectively. A rear control panel 346 is pneumatically connected to delivery hoses 332 and 334 by rear junction box 322 and rear gauge hoses 348 and 350, respectively. A battery 352 supplies power to compressor 310 through a wire 354 including a fuse 356 and terminating at a ground 358, which may be the chassis of a motor vehicle (not shown) on which shock absorber/spring system 300 is mounted. Battery 352 also supplies power to front control panel 336 and rear control panel 346. Contact points 1 represent the wiring (not shown in full for clarity) that connects battery 352 to front control panel 336 and rear control panel 346. Front control panel 336 is electrically connected to front junction box 324 by a front wiring harness 360 and front wiring 362. Front wiring 362 terminates in a ground 364, which may be the chassis of the vehicle (not shown). Rear control panel 346 is electrically connected to front junction box 324 by a rear wiring harness 366 and rear wiring 368. Rear wiring 368 terminates in a ground 370, which may be the chassis of the motor vehicle (not shown). A negative terminal 372 of battery 352 is also terminated at ground 364. Although grounds 358, 364 and 370 appear as separate grounds in FIG. 3, these grounds may be the same ground.

In operation, the air pressure in front air springs 302 and 304 is measured by front control panel 336 on a front air pressure gauge 374. Front air pressure gauge 374 includes two needles 376, each of which indicates the air pressure for one of the two front air springs 302 and 304. In order to adjust the pressure in either of front air springs 302 and 304, an appropriate switch (not shown) on front control panel 336 is activated to trigger one or more solenoids (not shown) in front junction box 324. The solenoids, which are pneumatic valves operated by an electric coil, may be used to inflate one of front air springs 302 and 304 by releasing air from main reservoir tank 316 into the appropriate front shock absorbing device. Solenoids may also be used to deflate one of the front air springs 302 and 304 by releasing air from the appropriate front shock absorbing device into the atmosphere through exhaust ports (not shown) in front junction box 324.

In operation, the air pressure in rear air springs 306 and 308 is measured by rear control panel 346 on a rear air pressure gauge 378. Rear air pressure gauge 378 includes two needles 380, each of which indicates the air pressure for one of the two rear air springs 306 and 308. In order to adjust the pressure in either of rear air springs 306 and 308, an appropriate switch (not shown) on rear control panel 346 is activated to trigger one or more solenoids (not shown) in rear junction box 322. The solenoids, which are pneumatic valves operated by an electric coil, may be used to inflate one of rear air springs 306 and 308 by releasing air from main reservoir tank 316 into the appropriate rear shock absorbing device. Solenoids may also be used to deflate one of the rear air springs 306 and 308 by releasing air from the appropriate rear shock absorbing device into the atmosphere through exhaust ports (not shown) in rear junction box 322.

Mounted on compressor 310 is a pressure switch 382. Pressure switch 382 is a sensor that causes compressor 310 to turn on when the pressure in main reservoir tank 316 drops below a minimum pressure and causes compressor to turn off when the pressure in main reservoir tank 316 reaches a maximum pressure. One preferred pressure switch turns the compressor on when the main reservoir tank drops below 115 psi and turns the compressor off when the main reservoir tank reaches 130 psi. One preferred pressure switch for use with an automobile turns the compressor on when the main reservoir tank drops below 135 psi and turns the compressor off when the main reservoir tank reaches 150 psi. Other minimum and maximum pressures may be preferred depending on how the shock absorber/spring system of the present invention is being used.

Although the embodiment of the present invention shown in FIG. 3 has front shock absorbing devices having a two-compartment structure, the front shock absorbing devices of a shock absorber/spring device of the present invention may have any convenient structure. Similarly, although the embodiment shown in FIG. 3 has rear shock absorbing devices a tapered cylindrical structure, the front shock absorbing devices of a shock absorber/spring device of the present invention may have any convenient structure.

Although one preferred shock absorber/spring system of the present invention is described above and shown in FIG. 3, the present invention encompasses using various configurations of compressors, junction boxes, reservoir tanks, control panels, electrical systems, pneumatic systems, etc.

A preferred compressor for the shock absorber/spring system of the present invention is a 12V powered unit that is able to crate 115-150 psi of compressed air. In order to fill the reservoir tanks of the shock absorber/spring system of the present invention more quickly, multiple compressors may be used.

One or more tanks may be used an air supply reservoir for the shock absorber/spring system of the present invention. Such a tank allows an operator to inflate the shock absorbing devices of the present invention with minimal delay. In general, the larger the volume of the reservoir, the more quickly the shock absorbing devices may be inflated.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A shock absorbing device comprising:
a hollow spring comprised of a springy material;
distal sealing means for sealing a distal end of said hollow spring;
proximal sealing means for sealing a proximal end of said hollow spring; and
a shock absorber including:
  a cylinder mounted in a proximal mount of said proximal sealing means; and
  a piston assembly having a piston, a piston rod and a piston assembly distal end, said piston slidably engaging said cylinder, said piston rod extending through and slidably and sealingly engaging a distal mount of said distal sealing means, said piston assembly distal end including a contacting means for urging said distal mount and said hollow spring distal end proximally when said contacting means is forced against said distal mount and for urging said piston assembly distally when said distal mount is forced against said contacting means.

2. The shock absorbing device of claim 1, wherein said distal mount is mounted on said distal end of said hollow spring.

3. The shock absorbing device of claim 2, wherein distal mount comprises a plate.

4. The shock absorbing device of claim 3, wherein said plate includes a neck portion extending into said hollow spring.

5. The shock absorbing device of claim 1, wherein said proximal mount is mounted on said proximal end of said hollow spring.

6. The shock absorbing device of claim 5, wherein distal mount comprises a plate.

7. The shock absorbing device of claim 6, wherein said plate includes a neck portion extending into said hollow spring.

8. The shock absorbing device of claim 1, wherein said cylinder extends through said proximal mount.

9. The shock absorbing device of claim 1, wherein said cylinder is mounted in said distal mount by thread means on said cylinder and said proximal mount.

10. The shock absorbing device of claim 1, wherein said hollow spring comprises a two-compartment bellows.

11. The shock absorbing device of claim 1, further comprising vehicle mounting means on said shock absorbing device for mounting said shock absorbing device on a vehicle.

12. The shock absorbing device of claim 1, wherein said distal mount includes one or more O-rings for sealingly and slidingly engaging said piston rod.

13. The shock absorbing device of claim 1, wherein said proximal mount includes one or more proximal O-rings for sealingly engaging said cylinder.

14. The shock absorbing device of claim 1, wherein said distal mount slidably and sealingly engages the sides of said piston rod.

\* \* \* \* \*